UNITED STATES PATENT OFFICE.

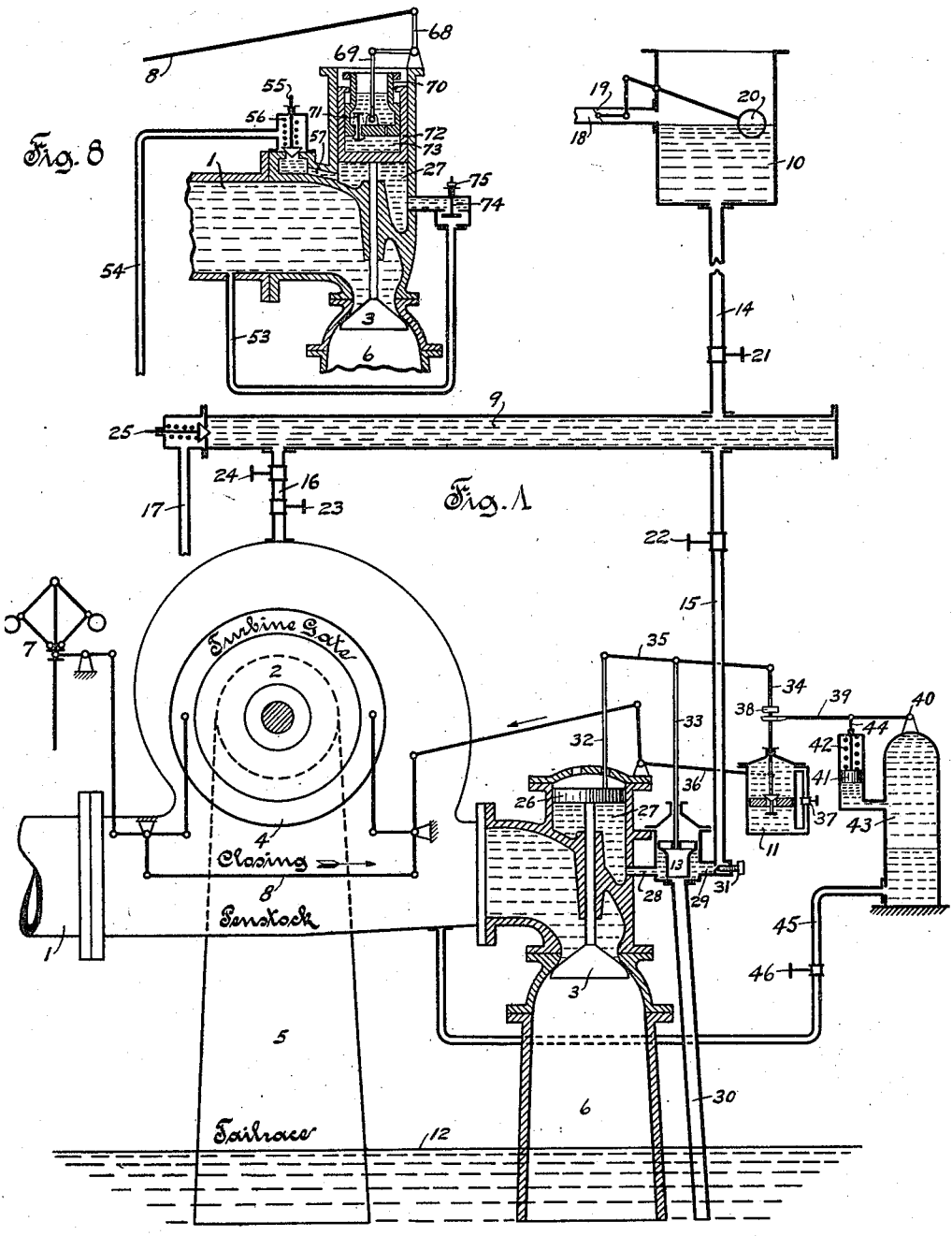

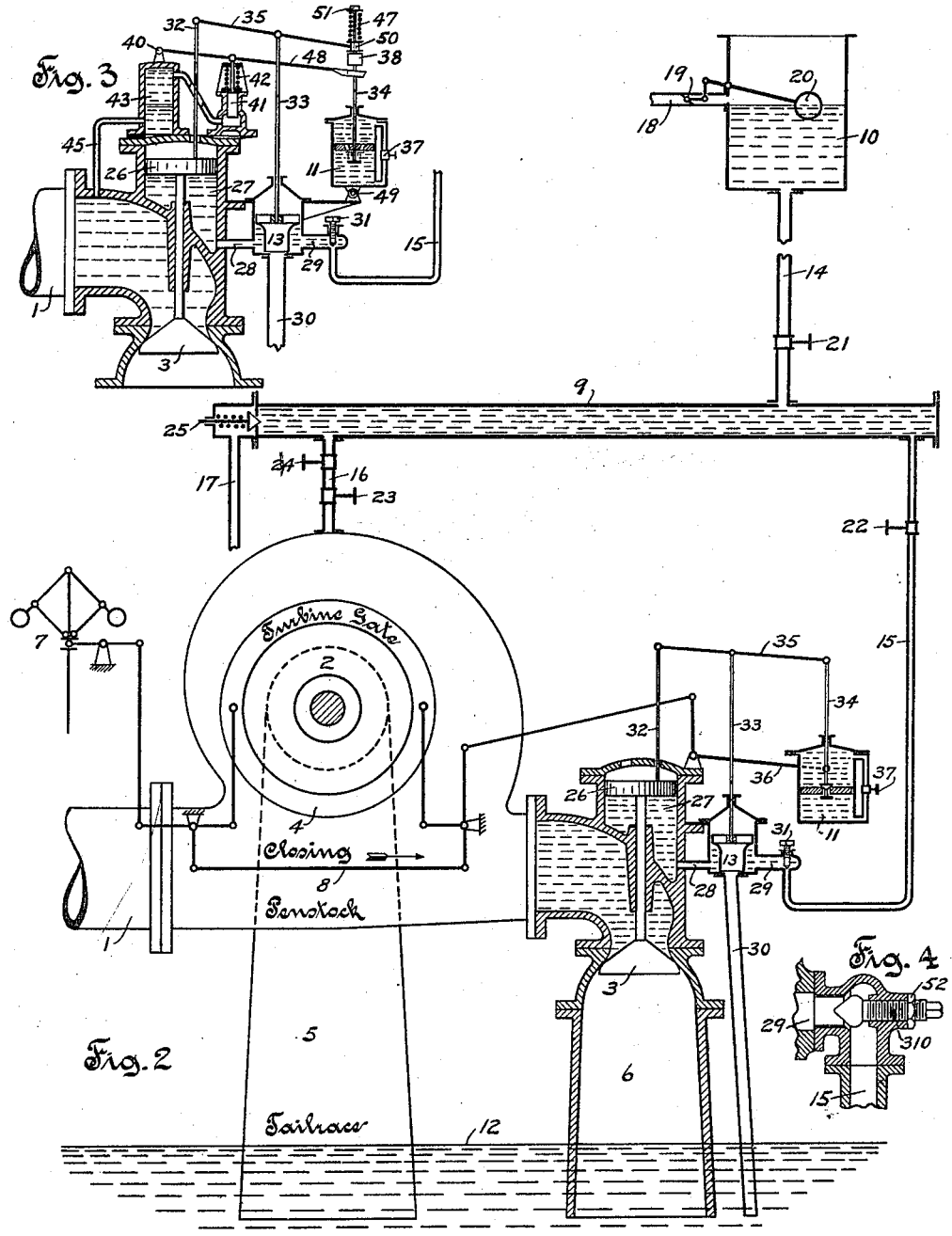

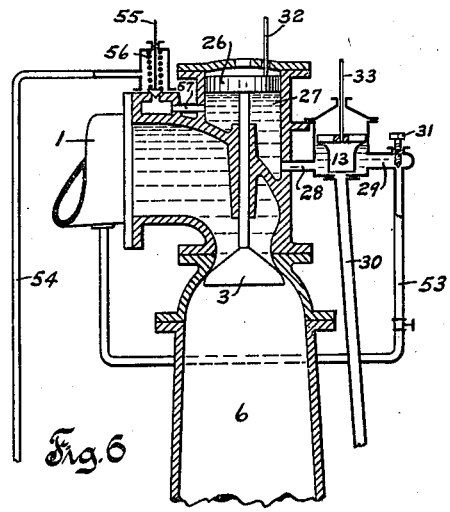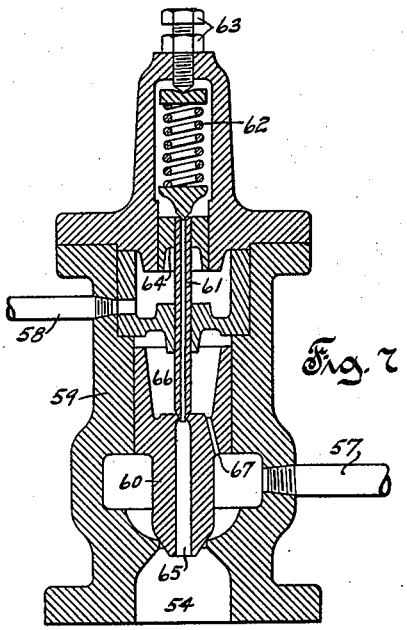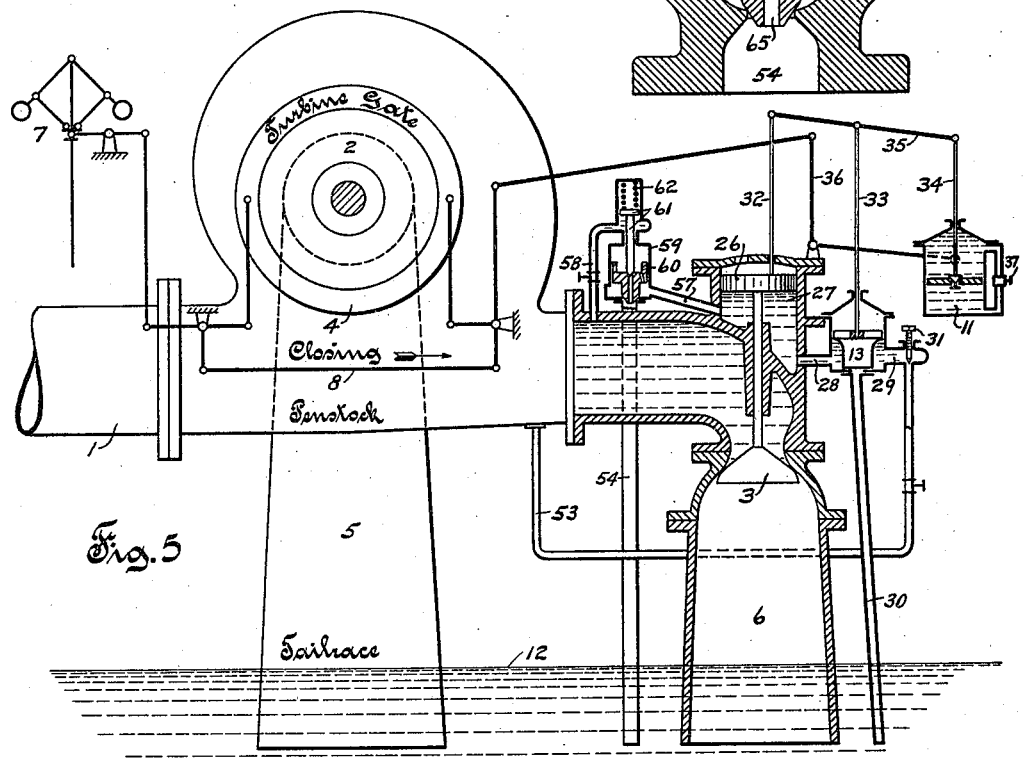

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

RELIEF MECHANISM.

1,309,808.  Specification of Letters Patent.  Patented July 15, 1919.

Application filed April 1, 1916. Serial No. 88,735.

*To all whom it may concern:*

Be it known that I, ARNOLD PFAU, a citizen of the Republic of Switzerland, residing at Milwaukee, in the county of Milwaukee and State of Wisconsin, have invented a certain new and useful Improvement in Relief Mechanisms, of which the following is a specification.

This invention relates to improvements in the construction of relief mechanism for regions of fluid under pressure, and is particularly applicable to devices for preventing injury to pipe lines or conduits which supply liquid under pressure to prime movers or other liquid utilizing devices in which the demand for liquid is subject to sudden variations.

An object of the invention is to provide a relief mechanism for regions of fluid under pressure, which is simple in construction and efficient in operation. One of the more specific objects is to provide a relief mechanism which will operate automatically to quickly relieve the liquid in a pressure region from excessive pressures. Another specific object is to provide a plurality of devices for effecting the operation of a relief valve, such devices being operable independently of each other either simultaneously or successively. A further specific object is to provide a plurality of sources of fluid under pressure for operating a relief valve so that if one of the sources fails the other will still be available. Still another object is to provide details of relief mechanism construction which will assist in making the mechanism positive, rapid and efficient in operation.

It has heretofore been customary to operate relief valves for sources of fluid under pressure, such as hydraulic pipe lines and penstocks, by means of devices operable by fluid under pressure supplied either by the penstock or some artificial source, and to control such operation either by means of linkage coacting with the prime mover governor or gate mechanism, or by means of devices operable directly by variations in the penstock pressure. In these prior devices, opening of the relief valve upon a sudden increase in pipe line or penstock pressure can be effected only upon operation of the mechanism either gate coacting or penstock pressure operated, which controls the release of the valve closing pressure, thus necessitating an undesirable delay in opening of the relief valve when the penstock pressure rises suddenly. The present invention contemplates the provision of means for quickly relieving the pipe line of excessive pressures when the pipe line pressure reaches a predetermined high point, without depending upon the operation of the mechanism which normally controls the flow of valve actuating fluid. This result is accomplished by providing means for predetermining the maximum pressure tending to close a relief valve which is movable to open position directly by the pipe line pressure. In accordance with the invention, the maximum pressure tending to close the relief valve may be predetermined either by controlling the pressure of the fluid in the source for operating the valve, or by limiting the maximum pressure attainable acting upon the valve closing piston.

It has also been customary to provide but a single device for controlling the admission and exhaust of operating fluid to and from the relief valve operating means, this device in some cases being linkage connecting directly with the gate mechanism of the fluid utilizing means, and in other cases being mechanism operated directly by variations in the penstock pressure. In case of failure of operation of the sole means for controlling the admission and discharge of relief valve actuating fluid in the devices of the prior art, no other means for effecting operation of the valve were available. With the present invention a plurality of devices for controlling the admission and release of valve operating fluid are provided. These devices are preferably independently operable and may be made to operate either simultaneously or successively under different conditions of operation.

The relief valves of the prior art are operated by means of fluid under pressure derived from a single source, namely, either the penstock or from some artificial source. If for any reason the pressure from this single source is not available, the relief valve cannot be operated. In order to avoid this undesirable condition, the present invention contemplates the provision of two or more sources of relief valve operating fluid so that if one of these sources fails, another will still be available and continuous operation of the plant is assured.

It has furthermore been customary to provide a throttle valve for controlling the rate of admission of fluid to the valve operating means. The throttle valves of the prior art were arranged so that the flow of fluid to the valve operating means would tend to open the throttle valve. In accordance with the present invention this throttle valve is so disposed that the flow of fluid to the relief valve operating means will always tend to close the throttle valve.

While the invention has been disclosed as applied to a relief valve for a penstock supplying hydraulic power to a Francis turbine, it should be understood that the invention is applicable generally to relief mechanisms for conduits containing fluid under variable pressure supplying or receiving fluid to or from any fluid translating device, such as prime movers or pumps. It should also be understood that the disclosure in the drawings is more or less diagrammatic and that relay and linkage mechanisms such as it is customary to utilize for multiplying limited power and motion, have been omittted in order to avoid unnecessary complication of the disclosure. Such mechanisms are ordinarily inserted between the governor collar and the turbine gate, the governor merely positioning a relatively small valve which controls the operation of a servo-motor which in turn actuates the turbine gates.

Some of the novel features of relief mechanism construction disclosed herein are claimed in copending application S. N. 515,890, filed Sept. 2, 1909, Patent No. 1,202,310, issued Oct. 24, 1916.

A clear conception of several embodiments of the invention may be had by referring to the drawings accompanying and forming a part of this specification in which like reference characters designate the same or similar parts in the various views.

Figure 1 is a diagrammatic part sectional view of a hydraulic power installation embodying one form of the invention.

Fig. 2 is a diagrammatic part sectional view of a hydraulic power installation embodying another form of the invention.

Fig. 3 is a diagrammatic part sectional view of a relief valve and actuating mechanism embodying another form of the invention.

Fig. 4 is a transverse vertical sectional enlarged view of an improved form of relief valve pressure controlling throttle valve.

Fig. 5 is a diagrammatic part sectional view of a hydraulic power installation embodying another form of the invention.

Fig. 6 is a diagrammatic part sectional view of a relief valve and actuating mechanism embodying another form of the invention.

Fig. 7 is an enlarged sectional view of a special form of pressure regulating valve used in the embodiment disclosed in Fig. 5.

Fig. 8 is a diagrammatic part sectional view of a relief valve and actuating mechanism embodying another form of the invention.

The specific type of power installation to which the invention is disclosed as applied, comprises essentially a source of liquid under pressure or penstock 1, a means for utilizing liquid under pressure or Francis turbine 2, and a relief valve 3 for the penstock 1, see Figs. 1, 2 and 5. The turbine 2 is provided with a suitable gate 4 which is movable through suitable mechanism by means of a speed governor 7 to vary the amount of fluid passing to the turbine 2 from the penstock 1. The turbine draft tube 5 discharges the spent fluid from the turbine directly into the tail-race 12 in the usual manner. The relief valve 3 controls the flow of fluid from the penstock 1 to the tail-race 12 through the draft tube 6, and is preferably located in a portion of the penstock adjacent the turbine gate 4. The relief valve 3 is of the type having a surface exposed to penstock pressure tending to open the valve and having a piston 26 exposed to pressure in a chamber 27 tending to close the valve.

Referring specifically to the disclosure in Fig. 1, the relief valve 3 is provided with a plurality of means for effecting the operation of the regulating valve 13 which controls the release of pressure for operating the relief valve 3. One of these means comprises a train of mechanism or linkage 8 connecting the governor 7 and turbine gate 4 with the regulating valve 13. The other of these means comprises an auxiliary piston 41 operable directly by variations in penstock pressure and adapted to move the same regulating valve 13.

The linkage means for effecting operation of the valve 3 comprises a series of levers and connections coacting with one arm of a bell crank 36, another arm of which carries a dash pot 11. The dash pot 11 is provided with a piston having a through port controlled by a valve secured to the piston rod 34. A throttle valve 37 controls a by-pass around the dash pot piston. The upper extremity of the piston rod 34 is pivotally connected to one end of a floating lever 35. The regulating valve 13 has a stem 33 which is pivotally connected to the mid portion of the floating lever 35. The valve 13 controls the discharge of fluid from the chamber 27 through the pipes 28 and 30 to the tail-race 12. The relief valve closing piston 26 carries a rod 32, the upper extremity of which is pivotally connected to the other end of the floating lever 35.

The fluid pressure operated means for controlling the operation of the relief valve 3 comprises a pressure chamber 43, the upper portion of which is preferably filled with oil and the lower portion of which is filled with water admitted from the penstock 1 through the pipe 45 and valve 46. The auxiliary piston 41 has its lower surface exposed to the penstock pressure within the chamber 43 and is provided with an adjustable spring 42 opposing the action of the fluid pressure upon the piston. The piston rod 44 is pivotally connected to the lever 39 at an intermediate point thereof. One end of the lever 39 has a stationary pivot 40 on the chamber 43. The opposite extremity of the lever 39 is forked and extends in proximity to the dash pot piston rod 34. The piston rod 34 at a point adjacent the forked end of the lever 39 is provided with an adjustable collar 38 with which the prongs of the forked end of the lever 39 are engageable under certain conditions of operation as will be later described.

As disclosed in Figs. 1 and 2, the installation is provided with a plurality of sources of fluid under pressure for operating the relief valve 3. One of these sources comprises a pressure supply tank 10 preferably placed at an elevation sufficiently high to produce a desired pressure head, which tank receives operating fluid through a pipe 18. The admission of fluid from the supply pipe 18 is controlled by means of a valve 19, the opening and closing of which is effected by means of a float 20. The discharge pipe 14 leads from the tank 10 to a header 9, this pipe being controlled by means of a valve 21. The other source of fluid supply is the penstock 1 which connects with the header 9 through a pipe 16. The pipe 16 is provided with a suitable throttle valve 24 and a cutoff valve 23. The header 9 is provided with an over-pressure discharge valve 25 which is preferably spring pressed to close the same by means of an adjustable spring. The valve 25 controls the discharge of over-pressure from the header 9 through the pipe 17 to the tail-race 12. The header 9 is provided with a discharge pipe 15 which connects with a pipe 29 leading into the casing of the regulating valve 13. The pipe 15 is controlled by means of a valve 22, and the rate of discharge of fluid from the pipe 15 to the pipe 29 is controllable by means of a suitable throttle valve 31.

Referring specifically to Fig. 2, the operation of the relief valve 3 is effected by a single means, namely, the linkage 8 connecting the governor 7 and the turbine gate 4, with the regulating valve 13. The penstock pressure actuated means for operating the relief valve disclosed in Fig. 1, has been omitted from the disclosure in Fig. 2. The two fluid pressure supply sources, namely, the pressure supply tank 10 and penstock 1, are available for operating the relief valve 3 in the disclosure of Fig. 2.

Referring specifically to Fig. 3, this figure discloses a relief valve and operating mechanism in which the valve 13 is operable only by variations in pressure in the penstock 1. The linkage 8 is not intended for use in connection with the valve disclosed in this figure. The pressure operated relief valve controlling device of Fig. 3 differs from that disclosed in Fig. 1 by having the dash pot 11 pivoted to a stationary element by means of a pivot 49. The piston 41 operates upon an intermediate point of a lever 48 having one end provided with a stationary pivot 40 and having its opposite end forked, the prongs of the fork being adapted to engage the collar 38 upon upward movement of the lever 48. The upper extremity of the piston rod 34 is provided with a collar 38 and a headed end 51. A collar 50 carried by the dash pot end of the floating lever 35, embraces the piston rod 34 at its portion between the collar 38 and the headed end 51, and is normally held in engagement with the collar 38 by means of a compression spring 47, the upper extremity of which reacts against the headed end 51.

Referring specifically to Fig. 4, this figure discloses a modified form of throttle valve 310 for controlling the rate of flow of fluid under pressure from the supply pipe 15 to the pipe 29. The throttle valve 310 differs from the valve 31 as disclosed in Fig. 2 by being provided with a bulb shaped end directed in the direction of flow of fluid past the valve. The valve 310 is provided with a screw threaded portion engaging the valve casing and may be locked in an adjusted position by means of a nut 52. With the construction of valve as disclosed in Fig. 4, if the threads on the valve or on the adjacent casing should strip, or if the valve stem should break, the valve 310 will tend to close off the flow of fluid from the pipe 15 to the pipe 29, thereby entirely cutting off the supply of fluid under pressure to the chamber 27 of the relief valve.

Referring specifically to Fig. 5, the relief valve 3 is provided with linkage 8 and compensating structure for closing the valve 13, which is similar to that disclosed in Fig. 2. The pressure supply for operating the relief valve in the disclosure in Fig. 5, is derived directly from the penstock 1 through a pipe 53 and valve 31. The pressure within the chamber 27 is prevented from increasing beyond a predetermined maximum by means of a valve 60, the details of construction of which are more clearly shown in Fig. 7. The valve 60 is housed within a casing 59 and has its lower surface normally exposed to pressure within the chamber 27 by means of a pipe 57. The fluid under pressure which enters the valve casing 59 through the pipe 57, passes through a small port 67 in the body of the valve 60 and establishes a pressure within the chamber 66 which normally holds the valve 60 against its seat and cuts off communication to the discharge pipe 54. An auxiliary valve 61 controls a through port 65 of relatively large area which extends through the valve 60. The auxiliary valve 61 is provided with a piston 64 the lower face of which is normally subjected to penstock pressure by means of a pipe 58. The valve 61 is normally held in closed position by means of a spring 62, the effective pressure of which is adjustable by means of adjusting devices 63.

Referring specifically to Fig. 6, the relief valve 3 is controllable by means of either linkage 8, as disclosed in Figs. 2 and 5, penstock pressure operated means as disclosed in Fig. 3, or a combined device as disclosed in Fig. 1. The relief valve operating pressure in the disclosure of Fig. 6 is derived directly from the penstock 1 through the pipe 53 and throttle valve 31. The pressure within the chamber 27 is prevented from rising beyond a predetermined maximum point by means of a supplemental relief valve 55, the opening of which may be controlled by means of an adjustable spring 56. The lower face of the valve 55 is normally subjected to the pressure within the chamber 27 by means of a pipe 57, and any discharge from the chamber 27 past the valve 55 is delivered to the tail-race by means of a pipe 54.

Referring specifically to Fig. 8, the relief valve 3 is operable directly by the gate rigging of the turbine 2 through linkage 8, thereby avoiding the use of an intermediate regulating valve 13. The linkage 8 connects with one arm of a bell crank 68, another arm of which is connected to a piston 70 by means of a link 69. The bell crank 68 has a stationary pivot upon the relief valve casing. The piston 70 is reciprocable within a bore formed in the relief valve closing piston 72, and has a pair of passages formed therethrough. One of these through passages is relatively large and is controlled by means of a spring pressed puppet valve 71, while the other passage is of relatively small cross-section. The recess in the piston 72 within which the piston 70 is reciprocable, is filled with a fluid such as oil. The relief valve closing pressure is derived directly from the penstock 1 through a pipe 53 and a flow controlled valve 74. The valve 74 is normally held open by gravity, the extent of opening being controllable by means of an adjusting device 75. When the valve 74 is closed, fluid can flow past the valve only through relatively small ports formed through the valve disk. The pressure within the chamber 27 is prevented from rising beyond a predetermined maximum point by means of a supplemental relief valve 55, the opening of which may be controlled by means of an adjustable spring 56. The lower face of the valve 55 is normally subjected to the pressure within the chamber 27 by means of a passage 57, and any fluid passing the valve 55 is discharged into the tail-race through the pipe 54.

During the normal operation of the installation, the valve 3 is closed and the turbine 2 is receiving a supply of liquid under pressure from the penstock 1 through the turbine gate 4. With the use of the linkage 8 and mechanism as disclosed in Figs. 1, 2, 5 and 6, for effecting operation of the relief valve 3, if the load on the turbine varies, the speed governor 7 is affected and adjusts the turbine gate 4 to accommodate the variation in load. If the turbine load increases, the gate adjusting ring is moved in an anticlockwise direction, causing the turbine gate to open. The opening motion of the turbine gate is transmitted to the lever 36 which moves the dash pot 11 in a downward direction, causing the through port in the dash pot piston to open and permitting free downward movement of the dash pot casing without disturbing the position of the piston rod 34 and the valve 13. This action of the mechanism is the same whether the load increase is rapid or slow. If the load on the turbine decreases, the gate operating ring is moved in a clockwise direction, causing the linkage 8 to move the bell crank 36 in an anticlockwise direction about its stationary pivot. If the closing of turbine gate is sudden, the bell crank 36 will raise the dash pot 11, causing the through port in the dash pot piston to close, and providing a positive connection between the casing of the dash pot and the piston rod 34. Upward movement of the piston rod 34 raises the end of the floating lever 35 connected with the rod 34, and produces opening of the regulating valve 13. As the valve 13 opens, the flow of fluid under pressure past the throttle valve 31 is insufficient to compensate for the discharge of fluid past the valve 13 through the pipe 30, thus causing the pressure in the chamber 27 to drop and permitting the pressure within the penstock 1 to open the valve 3. As the valve 3 opens, the rod 32 moves downwardly causing the regulating valve 13 to close and permitting the pressure within the chamber 27 to become gradually replenished and effective to automatically close the valve 3. If the closing of the turbine gate is relatively slow, the swinging of the lever 36 in an anticlockwise direction will cause the casing of the dash pot 11 to move upwardly without moving the piston rod 34. The fluid from below the dash pot piston will by-pass around the piston through the valve 37, thereby permitting relative longitudinal movement of the piston and dash pot casing.

In the devices employing the pressure operated mechanism for effecting operation of the relief valve 3, specifically shown in Fig. 1, if the turbine gate opens, the pressure within the chamber 43 will drop, causing the piston 41 to move downwardly. Downward motion of the piston 41 will cause the forked end of the lever 39 to move away from the collar 38 without affecting the dash pot 11. The pressure of the spring 42 is so adjusted that the lever 39 will engage the collar 38 only upon the existence of a predetermined pressure within the penstock 1. If this predetermined pressure is established in the penstock 1, the forked end of the lever 39 engages the collar 38 and causes the regulating valve 13 to open. This opening of the valve 13 causes the relief valve 3 to open automatically in the usual manner. In the pressure operated means for effecting the operation of the relief valve 3 as disclosed in Fig. 3, if the load on the turbine increases with a resulting decrease in the pressure in the penstock 1, the piston 41 will move downwardly, carrying the lever 48 downwardly and causing the forked end of the lever to move away from the collar 38, the spring 47 meanwhile supporting the weight of the piston and rod 34 and the regulating valve 13 being unaffected. If the penstock pressure increases due to a decrease in load on the turbine, the piston 41 is moved upwardly, compressing the spring 42 and raising the lever 48, bringing the forked end thereof in engagement with the collar 38 and opening the regulating valve 13. This opening of the regulating valve 13 causes the relief valve 3 to open automatically in the usual manner.

In the device disclosed in Fig. 8, if the turbine gate opens, the gate motion is transmitted to the bell crank 68 through the linkage 8, causing the bell crank to move in a clockwise direction about the pivot. This movement of the bell crank 68 raises the piston 70, causing the valve 71 to open and permitting the fluid to pass freely through the larger passage in the piston 70 without affecting the valve 3. If the turbine gate closes slowly, the relief valve 3 will be unaffected as the fluid will by-pass around the piston 70 through the small passage. If however, the turbine gate closes suddenly, the fluid will not be able to by-pass rapidly around the piston 70 and a positive connection will be established between the pistons 70, 72, causing the piston 72 to move downwardly to open the valve 3. After the valve 3 has been thus opened and a pressure rise within the penstock 1 avoided, the pressure within the chamber 27 gradually becomes effective to automatically close the valve 3.

The valve 3 may be caused to open and close synchronously with the closing and opening of the turbine gate 4 by locking the dash pot piston rods to the casings in the disclosures of Figs. 1, 2, 5 and 6, or by locking the pistons 70, 72, together in the device of Fig. 8. If the synchronous action is employed in the device of Fig. 8, the through ports in the flow actuated valve 74 must be of sufficient area to permit the fluid from within the chamber 27 to surge back and forth through the valve 74 as the valve 3 moves back and forth.

In the devices disclosed in Figs. 1, 2 and 3, the operating fluid under pressure for the relief valve 3 is normally supplied by the pressure tank 10, which in practice is preferably located at some point of higher elevation on a hill or mountain side. Due to the use of a tank 10 having a substantially constant level of liquid therein, the pressure in the pipe 15 is substantially constant at all times. The relief valve operating piston 26 is preferably made of such area that the total maximum pressure acting thereon and tending to close the valve 3 is equal to or less than a predetermined pressure in the penstock 1 tending to open the valve 3. The construction of the piston 26 is preferably such that the closing pressure will be overcome by the valve opening pressure when the penstock pressure rises a predetermined percentage above normal, thus causing the relief valve 3 to automatically open to relieve the excessive penstock pressure and thus avoiding injury to the pipe line. If the regulating valve 13 is closed during the period of pressure rise in the penstock, the fluid from within the chamber 27 is forced into the valve operating supply system past the throttle valve 31. By properly adjusting the valve 31, the rate of opening of the valve 3 may be readily varied within a considerable range. If the supply from the tank 10 should fail, as has been the case in an actual installation wherein the pipe line 14 was ruptured by an avalanche, the valve 21 which is preferably located at an accessible point, may be closed and the header 9 may be supplied with fluid under pressure directly from the penstock 1 through the valves 23, 24, and the pipe 16. As disclosed, the valve 23 is preferably a cutoff valve, while the valve 24 is a throttle valve adapted to reduce the penstock pressure to that desired for operation of the valve 3. The overflow valve 25 at the header 9 may be adjusted to open at any desired pressure, preferably a few pounds above the pressure desired for operation of the valve 3, and serves to prevent an increase of the pressure within the header 9 above a predetermined maximum, thereby maintaining the header pressure substantially constant.

In the disclosures in Figs. 5, 6 and 8, the relief valve closing pressure is prevented from exceeding a predetermined maximum value by means of the valves 55, 60. The valve 55 of Figs. 6 and 8 is similar to the valve 25 of Figs. 1 and 2, and serves to prevent the fluid pressure within the chamber 27 from rising beyond a predetermined maximum. If the valve 55 is adjusted so as to by-pass fluid when the pressure within the chamber 27 reaches a certain value, any increase in penstock pressure above that value will cause the valve 3 to automatically open. The valve 60, disclosed in Figs. 5 and 7 is especially applicable to installations wherein the valve closing piston is very large in proportion to the valve. If this is the case, the use of a valve 55, as disclosed in Fig. 6, would not suffice. With the use of a valve 60, the pressure for normally operating the relief valve to close the same, is considerably greater than the pressure tending to open the relief valve. Even by permitting a pressure great enough to endanger the pipe line to act upon the valve 3 to open the same, such pressure would not be sufficient to overcome a considerably lower pressure per square inch acting upon the area of the piston 26. In order to insure that such an abnormal increase in pipe line pressure will open the relief valve 3, the valve 60 is provided with an auxiliary operating valve 61, which upon abnormal increase in pressure in the penstock 1, will relieve the pressure in the chamber 66 and will cause the valve 60 to open suddenly to considerably reduce the pressure in the chamber 27. This considerable reduction in pressure in the chamber 27 immediately causes the pressure acting upon the valve 3 to become effective to open the relief valve. As soon as the pressure within the penstock 1 has been relieved, the spring 62 again becomes effective to force the valve 61 against its seat and the valve 60 is returned to closed position by the building up of pressure in the chamber 66 through the port 67.

It should be understood that it is not desired to be limited to the exact details of construction shown and described, for obvious modifications will occur to a person skilled in the art.

It is claimed and desired to secure by Letters Patent,—

1. In combination, a source of fluid pressure, a fluid pressure operated relief valve for said source, and a plurality of independent sources of fluid under pressure for operating said relief valve in one direction.

2. In combination, a source of fluid pressure, a device for varying the pressure in said source, a relief valve for said source, linkage connecting with said pressure varying device for effecting operation of said valve, and means operable by variations in the pressure in said source for effecting operation of said valve.

3. In combination, a source of fluid pressure, a device for varying the pressure in said source, a relief valve for said source, linkage connecting with said pressure varying device for effecting operation of said valve, means operable by variations in the pressure in said source for effecting operation of said valve, and means for predetermining the maximum pressure tending to close said valve.

4. In combination, a source of fluid pressure, a device for varying the pressure in said source, a relief valve for said source, means for effecting operation of said valve between predetermined limits of variation in pressure in said source, and means for effecting operation of said valve between other limits of variation in pressure in said source.

5. In combination, a source of fluid pressure, a fluid pressure operated relief valve for said source, a source of fluid under substantially constant pressure for operating said valve in one direction, and a source of fluid under variable pressures for operating said valve in the same direction.

6. In combination, a source of fluid pressure, a fluid pressure operated relief valve for said source, a pluarlity of independent sources of fluid under pressure for operating said relief valve in one direction, and means for predetermining the maximum pressure in said operating sources.

7. In combination, a source of fluid pressure, a fluid pressure operated relief valve for said source, a plurality of sources of fluid under pressure for operating said relief valve in one direction, and means for maintaining substantially constant the pressure for operating said relief valve.

8. In combination, a penstock, a fluid pressure operated relief valve for said penstock, a source of fluid under pressure for closing said valve, said source having a substantially constant head, and a second source of fluid under penstock pressure for closing said valve.

9. In combination, a penstock, a turbine for varying the pressure in said penstock, a relief valve for said penstock, linkage connecting with said turbine for effecting operation of said valve, means operable by variations in penstock pressure for effecting operation of said valve, a plurality of sources of fluid under pressure for operating said valve, and means for predetermining the maximum valve operating pressure.

In testimony whereof, the signature of the inventor is affixed hereto.

ARNOLD PFAU.